M. LOEB.
METHOD OF SEPARATING FAT.
APPLICATION FILED JAN. 22, 1917.
1,237,069.
Patented Aug. 14, 1917.
2 SHEETS—SHEET 1.
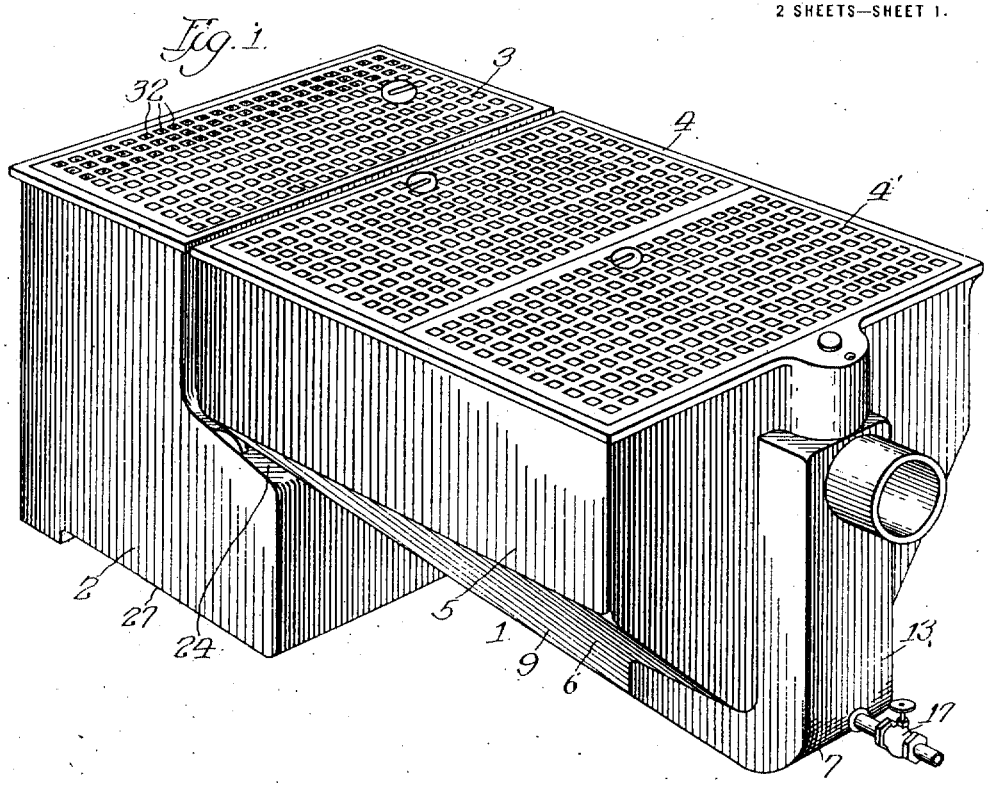
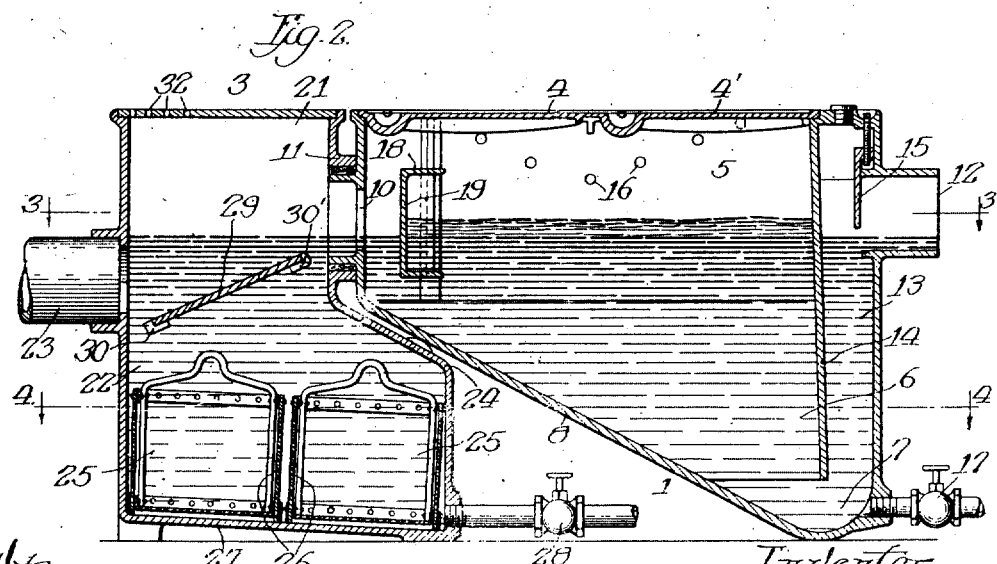

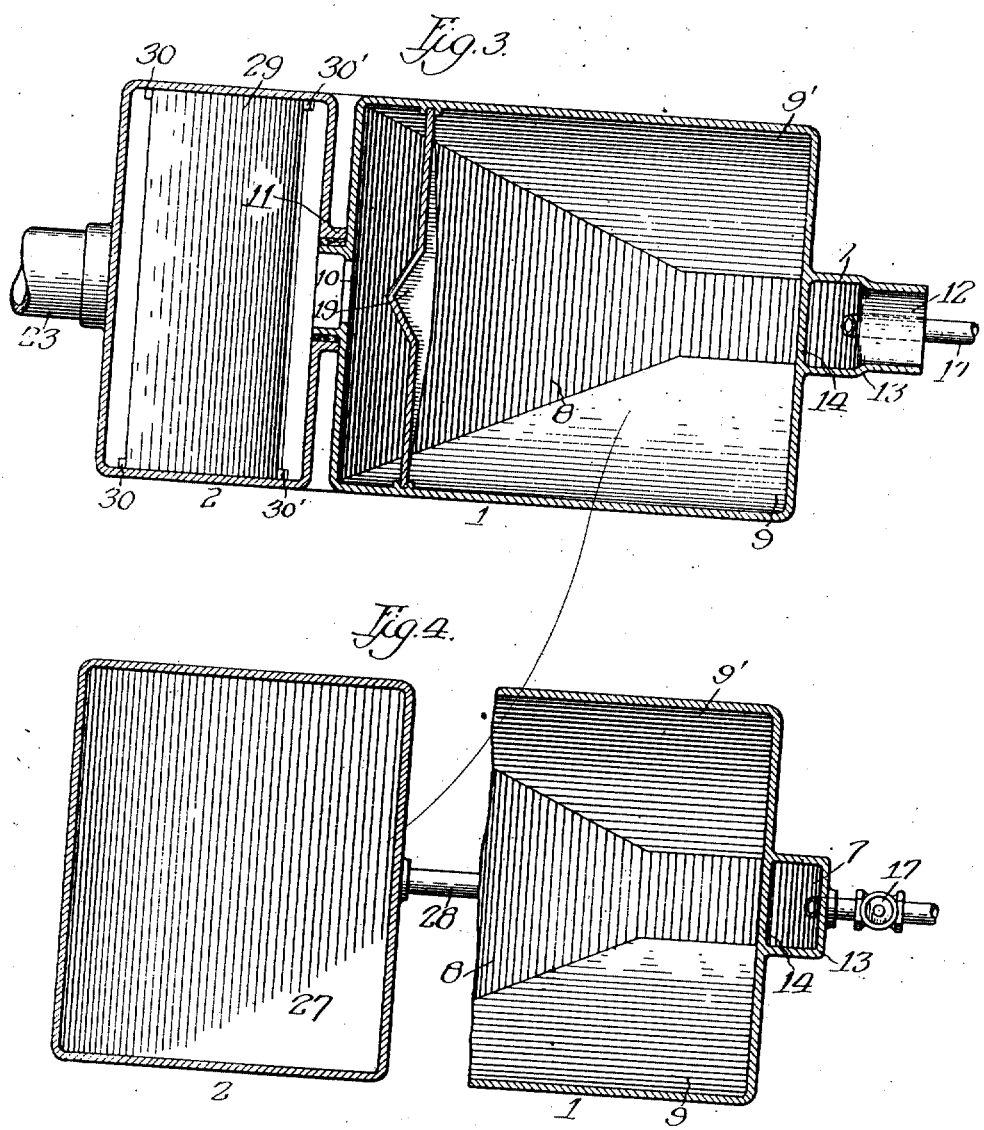

UNITED STATES PATENT OFFICE.

MAURICE LOEB, OF CHICAGO, ILLINOIS, ASSIGNOR TO NATIONAL SANITARY SERVICE COMPANY, OF CHICAGO, ILLINOIS, A CORPORATION OF ILLINOIS.

METHOD OF SEPARATING FAT.

1,237,069.  Specification of Letters Patent.  Patented Aug. 14, 1917.

Original application filed December 27, 1915, Serial No. 68,951. Divided and this application filed January 22, 1917. Serial No. 143,587.

*To all whom it may concern:*

Be it known that I, MAURICE LOEB, a citizen of the United States, residing at Chicago, in the county of Cook and State of Illinois, have invented certain new and useful Improvements in Methods of Separating Fat, of which the following is a specification.

The invention has to do with the recovery of fat held in suspension and more particularly its recovery from slaughter house refuse liquid.

In fat-suspending liquids of this character there is often a considerable amount of sediment which if allowed to remain in contact with the fat, causes fermentation and discoloration of the fat, increasing the amount of fatty acid therein, and furthermore the fat has a tendency to become rancid if allowed to remain for any considerable length of time in stale water.

The invention, therefore, reaches to the preliminary step of separating from the fat-containing liquid such sediment as may be carried thereby, and to the drawing off or removal of the fat after its separation from the liquid.

The invention is characterized, generally speaking, by the introduction of the fat-containing liquid to a pool or body of the liquid, the incoming liquid being discharged under some considerable pressure against a deflector preferably upwardly inclined toward an outlet, the introduction of the fat-containing liquid in this manner causing an ebullition of the same and a lowering of the pressure due to its distribution over a larger area thus permitting the solid matter or sediment to be precipitated into the lower portion of the pool while the liquid with its lighter fat content is discharged from said pool into a second pool or quiescent body of the liquid. The liquid is introduced to the second pool at the upper level thereof against a deflector by which it is directed downward beneath the surface of the pool and then along the bottom of the overlying quiescent body of liquid toward an outlet, the liquid flowing upward to the outlet and isolated from the main body of liquid in the second pool by a partition wall, whereby during the progress of the current of liquid along the bottom, the fat rises because of the difference in gravity to the upper portion of the quiescent body of liquid and may then be withdrawn from time to time as it accumulates. The arrangement is such that the current of liquid flowing along the bottom of the quiescent pool is progressively accelerated as to speed whereby separation is facilitated.

While the improved invention is independent of any particular form of apparatus for carrying out the same, I have, in order that the invention may be more readily understood, chosen to describe the same in connection with one form of apparatus by which it may be carried out, and for this purpose have selected that form of apparatus disclosed in my co-pending application, Serial No. 68,951, filed December 27, 1915, and of which application the present is a division. In such accompanying drawings—

Figure 1 is a perspective view of such apparatus;

Fig. 2 is a vertical longitudinal section of Fig. 1;

Fig. 3 is a horizontal longitudinal section taken on the line 3—3, Fig. 2;

Fig. 4 is a similar section on the line 4—4 Fig. 2.

Referring to the drawings, Figs. 1 and 2, 1 is the fat-recovery tank shown in its preferred embodiment, and 2 is the sediment-collecting tank, preferably used in connection with the fat-recovery tank, to separate most if not all of the sediment before the fatty liquid reaches tank 1. These tanks are preferably arranged to be located beneath the floor so that their tops are flush with the floor, their covers 3 and 4, 4' constituting gratings in the floor. The tanks may be located in a suitable pit or room below the floor so as to permit access around the same.

The tank 1 consists of an upper portion 5 of relatively large horizontal sectional area, and of a lower portion 6 which is narrower than the upper portion and gradually decreases in width toward the extreme bottom of the tank which terminates in an apex at 7. The object of the construction shown is to provide an upper portion of relatively large capacity as compared with the lower portion, for the purpose of holding a relatively large volume of fat-containing liquid substantially quiescent, notwithstanding the continual flow of liquid through the tank; and to this end, the sides of the upper portion of the tank are made substantially vertical so that the shape of this upper portion is rectangular and having a substantial depth. The desired function of the lower part of the tank is to cause a continuous current of liquid to flow beneath the upper quiescent fat-retaining stratum, and preferably to have the current flowing relatively slowly in the entrance end of the tank and gradually accelerating as it passes through and along the bottom of the tank to the exit end so as to take out any foul liquid at the bottom containing any sediment or solid matter that may not have collected in the sediment tank, or which will be in the liquid in large quantity if the sediment tank is not used. It is also desirable that the total capacity of the tank shall progressively increase from the inlet, whereby to provide a larger volume of relatively quiescent liquid above the underlying current, the quiescent body of liquid deepening toward the outlet and also widening upwardly so that the upward movement of the fat therein shall gradually become slower as the cross section increases. To this end, the tank is constructed much deeper at the exit end than at the entrance end, and the bottom of the tank is very narrow a: the exit end and widens out as it extends upwardly toward the shallower entrance end. In the form of apparatus shown, this is accomplished by providing bottom wall 8, as shown in Fig. 3, extending upwardly from the bottom of the exit end to the entrance end and flaring outwardly, and by providing side walls 9, 9' diverging upwardly from the bottom wall of the tank to the side walls of the upper portion of the tank. This construction provides a narrow channel on the bottom of the tank to cause a substantial current of the liquid to flow therethrough.

The upper portion of the tank 1 at its entrance end, is provided with an inlet opening 10 communicating with an outlet opening 11 in the sediment tank, when one is used; and at its opposite end, this upper portion is provided with an outlet 12 which, in the form shown, is on a level with the inlet 10. The tank 1 is also provided with a suitable discharge passage extending from the lower portion of the tank upwardly to the outlet opening, and in the present form of the invention, this discharge opening is formed integrally with the tank in a projection 13, with a partition 14 dividing the same from the rest of the tank, except for the communcation at the bottom. This exit passage is provided with a suitable hand-operated gate valve 15, the function of which is to close the outlet at any time so as to cause an increased height of liquid within the tank 1, and hence cause any fat that may collect on top of the same to automatically flow out of the tank, preferably through openings 16 arranged in a V outline, or in any other suitable outline, so that the capacity of these outlets is gradually increased with an increased supply of the fat. The discharge passage is of relatively small cross-sectional area so as to form a continuation of the contracted channel at the bottom portion of the tank, but this passage slightly increases in cross-sectional area from the bottom upwardly so as to increase the siphon action on the liquid. This may be accomplished in the form of apparatus shown, by slightly inclining the partition 14 or otherwise contracting any wall or walls of the discharge passage into whatever form they may be constructed.

The tank 1 is also provided with a drain pipe and valve 17 to clean out the bottom of the same in case of any trouble, and with a baffle plate 18 arranged across the upper portion of the tank in front of the inlet opening 10, this baffle plate having a projection 19 preferably V-shaped in horizontal section. The baffle plate extends below the inlet opening, and, as constructed, performs the double function of spreading the incoming current of liquid laterally and causing it to flow downwardly so as not to unduly disturb the quiescent stratum of fat-containing liquid in the upper portion of the tank behind the baffle plate on which the fat is being accumulated.

In the more complete and perfect form of the invention, the sediment-collecting tank 2 is used in conjunction with the fat-recovery tank, and in its preferred form, it consists of two portions, an upper portion 21 and a lower portion 22. The upper portion 21 has at one end the afore-mentioned outlet opening 11 fitting the opening 10 to the fat-recovery tank, and at its opposite end an inlet opening 23 located somewhat below the line of the outlet opening, for the purpose hereinafter described. The length of the upper portion between said openings 11 and 23 is preferably relatively short, while the length of the lower portion 22 is made longer to give the lower portion greater capacity, and the extended end of the lower portion forms a ledge or shelf 24 for supporting the adjacent bottom wall of the fat-recovery tank. The lower portion of the tank 2 is the portion in which the sediment is collected, and for the purpose of readily removing the same, I provide one or more troughs 25 into which the sediment or solid matter is precipitated, and these may be lifted out of the top of the tank by suitable means; and to enable them to be lifted without suction or interference one with the other, their side walls 26 are tapered downwardly and inwardly. The bottom wall of the sediment tank 27 is inclined toward a drain pipe and valve 28.

In order to precipitate the sediment from the fat-containing liquid within the tank 2 and cause the fat-containing liquid to flow into the fat-recovery tank after the sediment or solid matter has been precipitated, I provide a baffle or deflector plate 29 within the upper portion of the sediment tank arranged across the same intermediate the inlet and outlet openings and inclined from the bottom of the inlet opening upwardly to the bottom of the outlet opening, so that as the liquid is discharged against this plate, it strikes the same, causing the sediment or solid matter to be precipitated into the lower portion of the tank while the liquid thus freed of the sediment is deflected by the inclined surface of the plate through the opening into the tank 1. This plate is supported on lugs 30, 30' from which it may be lifted in order to lift the troughs 25. The tank is also provided with a detachable cover 3 having drain openings 32 on its forward end through which the washings of the floor or other liquid containing fat may be swept or flushed, these openings being in alinement with the front end of the deflector plate to allow the liquid to enter the sediment tank at a point where the solid matter therein can settle in the tank 2 while the fat is deflected into the fat-recovery tank.

The operation of the apparatus just described in the carrying out of the invention is as follows:

As the liquid is discharged from the inlet pipe 23 into the tank 2, it strikes the baffle plate, causing the heavy sediment or solid matter, or a large portion of the same, to be precipitated into the relatively quiescent volume of water in the lower part of the tank 2, from which it settles into the buckets or troughs 25, the fat-containing liquid at the same time being deflected and caused to flow through the opening between the tanks into the fat-recovery tank, where it strikes the V-shaped projection of the baffle plate 18, causing the liquid to be spread laterally and at the same time deflected downwardly. As the liquid passes below the baffle plate flowing slowly, the fat rises into the relatively quiescent body behind the baffle plate, while the heavier liquid within the tank 1 is caused to flow with acceleration down the narrowing bottom portion of the tank and up through the discharge passage and outlet. The current at the apex of the tank 1 is sufficient to take out sediment that may collect at that point.

It will thus be seen that the process may be carried out continuously until it is desired to remove the sediment from the troughs, and that the liquid in the upper portion of the fat-recovery tank is maintained substantially quiescent for the separation of the fat therefrom; and that the fat which gathers on top of this liquid is kept free of the sediment which would cause fermentation, and is kept from becoming rancid by reason of the fact that as the fat is separated from the liquid, such liquid is carried off in the current flowing through the bottom of the tank. The invention has proven highly efficient, both in the percentage of fat recovery from fat-containing liquid and in the freshness of the same and the small percentage of fatty acids therein.

I claim:

1. The method of recovering fat from waste fat-carrying liquids which consists in maintaining a relatively large quiescent body of the liquid above an underlying progressively accelerating transverse current of the same, whereby the fat may separate by gravity in the quiescent area and the waste be drawn off below.

2. The method of recovering fat from waste fat-carrying liquids which consists in maintaining a quiescent body of the liquid, and causing a transverse current of the fat-carrying liquid to flow with progressively accelerating speed beneath and in contact with the superposed quiescent body, whereby the fat may separate by gravity in the quiescent area and the waste be drawn off below.

3. The method of recovering fat from fat-carrying liquids which consists in maintaining a progressively deepening and upwardly widening quiescent body of the liquid, introducing to said body a current of fat-carrying liquid, deflecting the flow downwardly and along the bottom of said body and discharging the liquid current by an upward flow isolated from said body, whereby the fat may be separated by gravity in the quiescent area and the liquid vehicle be removed from below.

4. The method of recovering fat from fat-carrying liquids which consists in maintaining a quiescent body of the liquid, and introducing to said body near the upper portion thereof a current of fat-carrying liquid, deflecting the flow downwardly and along the bottom of said body with progressive acceleration and discharging the liquid current at substantially the level of the quiescent body by an upward flow isolated from said body, whereby the fat may separate by gravity in the quiescent area.

5. The method of recovering fat from fat-carrying liquids which consists in maintaining a relatively large progressively deepening and upwardly widening quiescent body of the liquid, introducing to said body near the upper portion thereof a current of fat-carrying liquid, deflecting the flow downwardly and along the bottom of said body with progressive acceleration and discharging the liquid current at substantially the level of the quiescent body by an upward flow isolated from said body, whereby the fat may separate by gravity in the quiescent area.

6. The method of recovering fat from fat-carrying liquids which consists in first maintaining a pool of the liquid having an inlet and an outlet, introducing the liquid to said pool and deflecting the same toward the outlet above the main body of the pool whereby to permit any sediment to deposit by gravity, and secondly in maintaining a second quiescent body of the liquid, and introducing to said body the outflow of liquid from the first pool of fat-carrying liquid and causing the liquid so introduced to flow beneath and in contact with the superposed quiescent body, whereby the fat may separate by gravity in the quiescent area and the liquid vehicle be removed from below.

7. The method of recovering fat from fat-carrying liquids which consists in first maintaining a pool of the liquid having an inlet and an outlet, introducing the liquid to said pool and deflecting the same toward the outlet above the main body of the pool whereby to permit any sediment to deposit by gravity, and secondly in maintaining a second quiescent body of the liquid, and introducing to said body the outflow of liquid from the first pool and causing the liquid so introduced to flow with progressively accelerating speed beneath and in contact with the superposed quiescent body, whereby the fat may separate by gravity in the quiescent area.

8. The method of recovering fat from fat-carrying liquids which consists in first maintaining a pool of the liquid having an inlet and an outlet, introducing the liquid below the outlet and deflecting the same toward the outlet above the main body of the pool, whereby to permit any sediment to deposit by gravity, and secondly in maintaining a second quiescent body of the liquid and introducing to said quiescent body near the upper portion thereof the outflow from the first pool, directing the liquid so introduced downwardly and along the bottom of said body with progressive acceleration and discharging the liquid current at substantially the level of the quiescent body by an upward flow isolated from said body, whereby the fat may separate by gravity in the quiescent area.

9. The method of recovering fat from fat-carrying liquids which consists in maintaining a relatively large progressively deepening and upwardly widening quiescent body of the liquid, introducing to said body near the upper portion thereof a current of fat-carrying liquid, deflecting the flow downwardly and along the bottom of said body with progressive acceleration and discharging the liquid current at substantially the level of the quiescent body by an upward flow isolated from said body, whereby the fat may separate by gravity in the quiescent area, and removing the accumulated fat from time to time from the surface of the quiescent body of liquid.

In witness whereof I have hereunto signed my name in the presence of two subscribing witnesses.

MAURICE LOEB.

Witnesses:
ABRAM B. STRATTON,
E. E. WILEY.